A. E. SMITH.
BACKSTAY FASTENING DEVICE.
APPLICATION FILED JULY 8, 1910.
992,274.
Patented May 16, 1911.
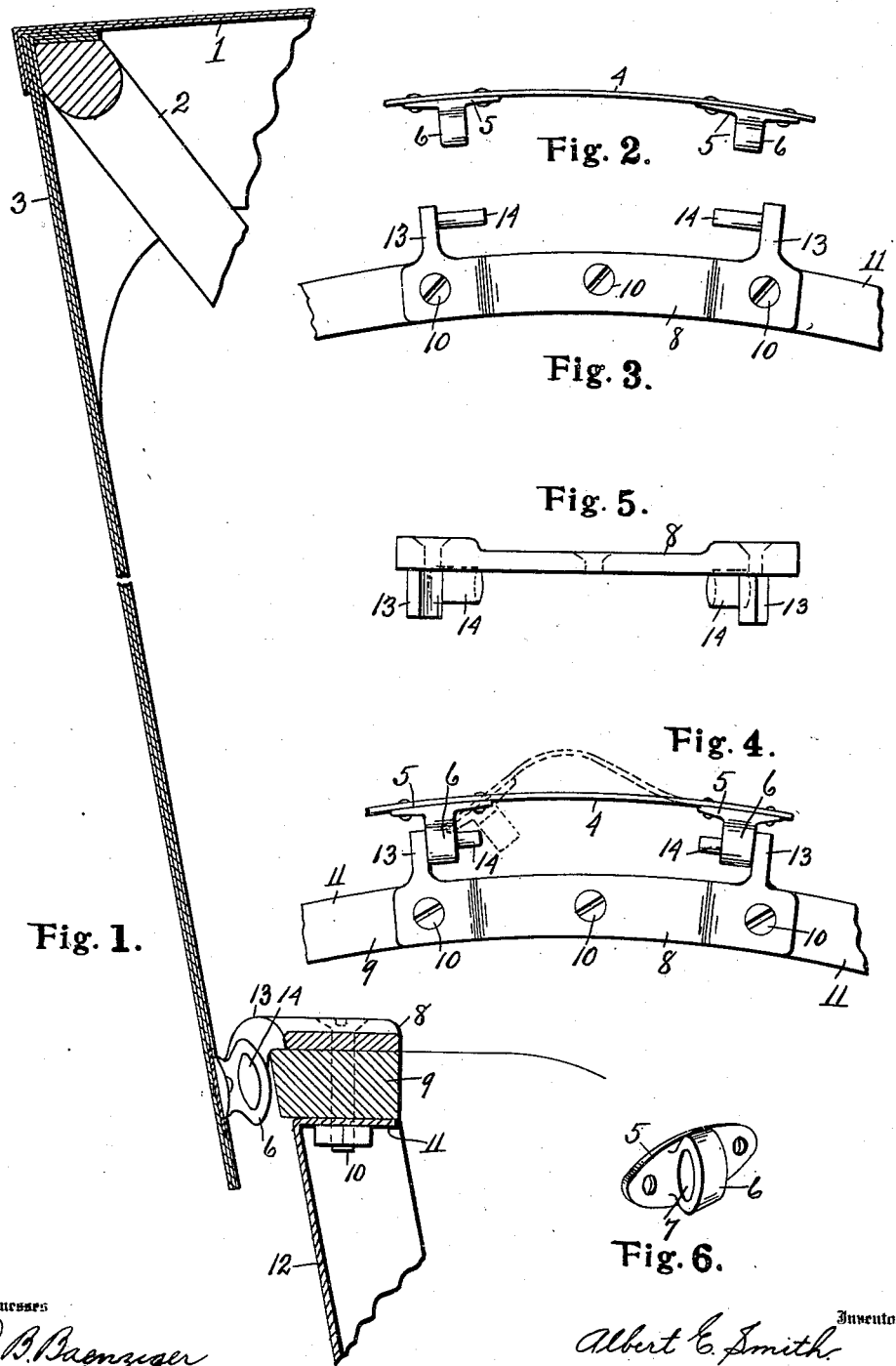

UNITED STATES PATENT OFFICE.

ALBERT E. SMITH, OF DETROIT, MICHIGAN, ASSIGNOR OF ONE-HALF TO LEONARD A. YOUNG, OF DETROIT, MICHIGAN.

BACKSTAY-FASTENING DEVICE.

992,274. Specification of Letters Patent. Patented May 16, 1911.

Application filed July 8, 1910. Serial No. 570,977.

*To all whom it may concern:*

Be it known that I, ALBERT E. SMITH, a citizen of the United States, residing at Detroit, in the county of Wayne, State of Michigan, have invented certain new and useful Improvements in Backstay-Fastening Devices; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to fastening devices for the back stays of automobile tops, and consists in the construction and arrangement of parts hereinafter more fully set forth and pointed out in the claims.

The object of the invention is to provide simple and efficient means for fastening the lower ends of the back stays of automobile tops to fittings attached to the body of the vehicle, whereby a firm and secure fastening of the stays may be effected; the arrangement being such as to enable the stays to be readily attached and detached, and to maintain an unvarying relation between the attaching members on the body with which the attaching members on the stays engage in a manner to prevent accidental disengagement between said parts.

The above object is attained by the structure illustrated in the accompanying drawings, in which:—

Figure 1 is a fragmentary view in section showing my improved means for attaching the stay to the vehicle body. Fig. 2 is a plan view of a pair of the attaching members which are mounted on the stay, showing said members connected by a spring bar. Fig. 3 is a fragmentary view in plan showing a pair of the attaching members mounted on the body with which the members carried by the stay are to be detachably engaged. Fig. 4 is a plan view of the parts shown in Figs. 2 and 3 engaged to fasten the lower end of the back stay to the body, said view illustrating by dotted lines the method of engaging and disengaging said parts. Fig. 5 is an edge elevation of the body fitting. Fig. 6 is a perspective view of one of the plates carrying an apertured lug adapted to receive the attaching pin on the body fitting.

Referring to the characters of reference, 1 designates part of an automobile top showing a portion of the rear bow 2, to which is suitably attached the upper end of the back stay 3. Embedded in and crossing the lower end of the stay transversely is a thin, flexible bar of spring metal 4. Riveted, or otherwise permanently secured to the opposite ends of said spring bar are the plates 5 carrying the projecting lugs 6 provided with the transverse apertures 7. To attach the lower end of the back stay to the body through the medium of the fastening lugs 6 carried by said stay, a fitting 8 is employed which is mounted upon the top rail 9 of the body and is secured by means of the screw bolts 10 which pass through said fitting, the rail 9, and through the horizontal flange 11 at the upper margin of the metal body 12. The fitting 8 is curved to coincide with the curve of the body and is provided with rearwardly and downwardly extending brackets 13 from whose inner faces project the lateral fastening pins 14 adapted to enter the apertures 7 of the lugs 6 and coinciding in cross section with the shape of said apertures, which, it will be noted are elliptical, an arrangement which prevents the turning of the lugs 6 upon said pins when the parts are engaged. There will be one of the fittings 8 for each of the back stays, and all of the parts of said fitting being formed integral, there is an unvarying distance between the brackets 13. By mounting the plates 5 the proper distance apart upon the spring bar 4 to correspond with the distance between the brackets 13, a perfect operative association of the fastening parts is always assured.

When it is desired to connect the apertured lugs 6 with the pins of the brackets 13 to securely fasten the lower end of the back stay, said stay at its lower end is slightly folded transversely so as to buckle the spring bar 4, as shown by dotted lines in Fig. 4, thereby shortening the distance between the lugs 6 and permitting them to be entered between and slipped over the ends of the pins 14, when upon releasing the back stay, the bar 4 will straighten because of its resiliency, to the position shown by solid lines in Fig. 4, thereby effecting a secure connection between the lower end of the back stay and the body of the vehicle. Because of the fact that the fastening lugs and pins are at one side of the line of draft upon the back stay, there is a constant tendency for said lugs to turn upon said pins which is resisted by the shape of the apertures in said lugs and of the pins which fill said apertures, whereby the rotation of the lugs upon the pins is obviated and the back stay is held perfectly straight and taut. To disconnect the fastening lugs from the pins 14 in order to release the back stay when it is desired to roll it up, said stay is folded so as to again buckle the spring bar 4 to enable one of said lugs to be withdrawn from its attaching pin, when the other of said lugs may be withdrawn from its pin to entirely release the lower end of the stay.

The spring bar 4 upon which the lugs 6 are mounted, extending transversely of the back stay and being secured therein, materially strengthens said stay and obviates the liability of said lugs being torn from their fastening by any strain to which said stay may be subjected, while the manner of securing the fitting 8 to the body obviates the possibility of the brackets with the fastening pins being torn therefrom.

Having thus fully set forth my invention, what I claim as new and desire to secure by Letters Patent, is:—

1. A back stay fastening, comprising body fittings having fastening members, a stay, a resilient strip extending transversely of said stay, and fastening members mounted on said strip and coöperating with the fastening members on the body to effect a locking engagement by a relatively lateral movement of said members.

2. A back stay fastening, comprising a fitting adapted to be mounted on the body having fastening parts, a stay, a spring bar attached to and extending transversely of said stay, and fastening parts secured to the ends of said spring bar adapted to coöperate with the fastening parts on the body to secure the stay thereto by a relatively lateral movement between the fastening parts on the body and stay.

3. A back stay, comprising a fitting adapted to be mounted on the body having projecting brackets carrying laterally extending pins, a stay, apertured lugs mounted upon the stay and spaced a distance equal to the distance between the brackets of the body fitting, and a flexible connection between said lugs to permit them to be entered onto said pins.

4. A back stay fastening, comprising a body fitting having extending brackets carrying laterally projecting pins, a stay, a pair of lugs mounted on the stay and apertured to receive said pins, and means flexibly connecting said lugs whereby they may be moved laterally to enable them to be entered upon the fastening pins of the body fitting and means for preventing a rotary movement between the pins and lugs.

5. A back stay fastening, comprising a body fitting having projecting brackets carrying laterally extending fastening pins, a stay, brackets mounted upon the stay carrying lugs having apertures adapted to receive said pins, and a spring metal strip extending between and connecting said lugs to permit them to be entered upon the fastening pins of the body fitting and maintain them yieldingly thereon.

6. A back stay fastening comprising a body fitting having extending brackets and pins projecting laterally from said brackets, a stay, a strip of spring metal embedded in the stay to extend transversely thereof, lugs mounted upon the ends of said spring metal strip, said lugs being apertured to receive the pins of the body fitting, said lugs being movable longitudinally of said pins but held from rotary movement thereon.

In testimony whereof I sign this specification in the presence of two witnesses.

ALBERT E. SMITH.

Witnesses:
E. S. WHEELER,
I. G. HOWLETT.

---

Copies of this patent may be obtained for five cents each, by addressing the "Commissioner of Patents, Washington, D. C."